(12) United States Patent
Hsiung

(10) Patent No.: US 6,662,849 B1
(45) Date of Patent: Dec. 16, 2003

(54) SHADING DEVICE FOR AUTOMOBILE

(76) Inventor: Ming-Te Hsiung, No. 12, Cheng-Hsi Lane, Lin-Ya Dist., Kaohsiung City (TW)

( * ) Notice: Subject to any disclaimer, the term of this patent is extended or adjusted under 35 U.S.C. 154(b) by 0 days.

(21) Appl. No.: 10/244,896

(22) Filed: Sep. 16, 2002

(51) Int. Cl.$^7$ .................................................. A47H 1/00
(52) U.S. Cl. ............. 160/122; 160/370.21; 160/370.22; 296/97.7; 296/136
(58) Field of Search ........................... 160/122, 370.21, 160/370.22, 294; 296/97.4, 97.7, 97.8, 97.9, 136

(56) References Cited

U.S. PATENT DOCUMENTS

| | | | | |
|---|---|---|---|---|
| 2,609,042 A | * | 9/1952 | Chamberlain | 160/122 X |
| 3,050,075 A | * | 8/1962 | Kaplan et al. | 160/122 X |
| 5,615,725 A | * | 4/1997 | Ming-Shun | 160/370.22 |
| 5,615,924 A | * | 4/1997 | Owen | 296/95.1 |
| 5,685,354 A | * | 11/1997 | Kim | 160/122 |
| 5,820,196 A | * | 10/1998 | Rudys et al. | 296/136 |
| 6,318,788 B1 | * | 11/2001 | Jaurigue | 296/97.4 |
| 6,513,858 B1 | * | 2/2003 | Li et al. | 296/136 |

* cited by examiner

Primary Examiner—Bruce A. Lev
(74) Attorney, Agent, or Firm—Akin Gump Strauss, Hauer & Feld, L.L.P.

(57) ABSTRACT

A shading device includes a shell member mounted on a roof of an automobile in a direction transverse to a front-to-rear direction of the automobile and having a receiving space, a winding shaft pivotally mounted in the receiving space of the shell member, a shading member wound around the winding shaft and received within the shell member, a pair of spaced apart base members adapted to be mounted on the automobile and spaced from the shell member in the front-to-rear direction, at least one pair of supporting legs mountable on the base members respectively, and an operating bar connected to one end portion of the shading member and operable to unwind the shading member. The operating bar is mountable detachably on the supporting legs to stretch out the shading member.

4 Claims, 6 Drawing Sheets

SHADING DEVICE FOR AUTOMOBILE

BACKGROUND OF THE INVENTION

1. Field of the Invention

The invention relates to a shading device for an automobile, more particularly to a shading device capable of efficiently shading an automobile from sunlight and rain while the automobile is in motion.

2. Description of the Related Art

Referring to FIGS. 1 and 2, a conventional shading device is shown to include a base 3' mounted on a roof 41' of an automobile 4', a shell member 1' mounted on the base 3' and having two receiving spaces 12', two winding shafts 13' pivotally mounted in the receiving spaces 12' of the shell member 1' respectively, and two shading members 2' wound around the winding shafts 13' respectively and received within the shell member 1'. Each of the shading members 2' is provided with at least one hook 22' at an end portion distal from the winding shafts 13'. The hooks 22' of the shading members 2' can be anchored to front or rear bumpers of the automobile 4' after the shading members 2' are stretched out of the shell member 1' so as to shade the automobile 4' from sunlight and rain. However, the conventional shading device can only be used to shade the automobile 4' when the latter is at a parked state.

SUMMARY OF THE INVENTION

The object of the present invention is to provide a shading device capable of efficiently shading an automobile from sunlight and rain while the automobile is in motion.

Accordingly, the shading device of this invention includes a shell member adapted to be mounted on a roof of an automobile in a direction transverse to a front-to-rear direction of the automobile and having a receiving space, a winding shaft pivotally mounted in the receiving space of the shell member, a shading member wound around the winding shaft and received within the shell member, a pair of spaced apart base members adapted to be mounted on the automobile and spaced from the shell member in the front-to-rear direction, at least one pair of supporting legs mountable on the base members respectively, and an operating bar connected to one end portion of the shading member and being operable to unwind the shading member. The operating bar is mountable detachably on the supporting legs to stretch out the shading member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
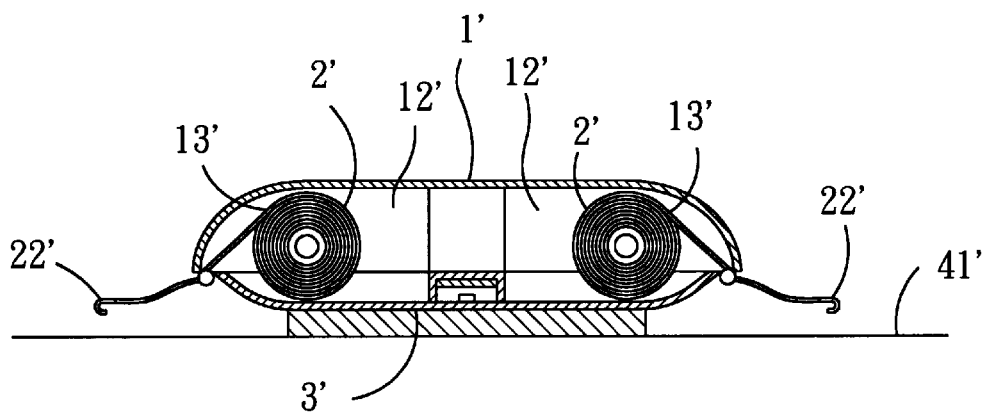
FIG. 1 is a sectional view of a conventional shading device for an automobile.
Figure 2:
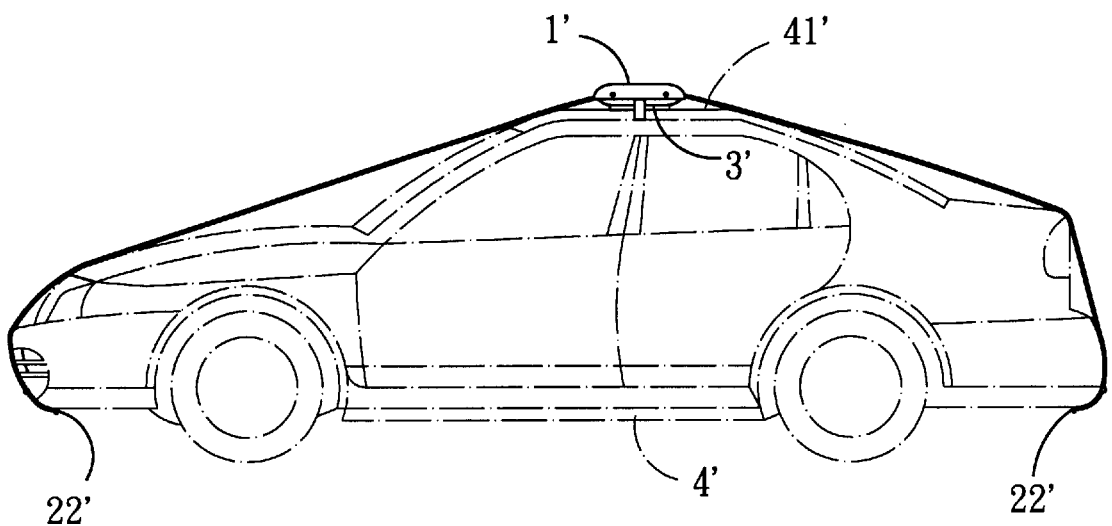
FIG. 2 is a sectional view illustrating the conventional shading device when shading a parked automobile.
Figure 3:
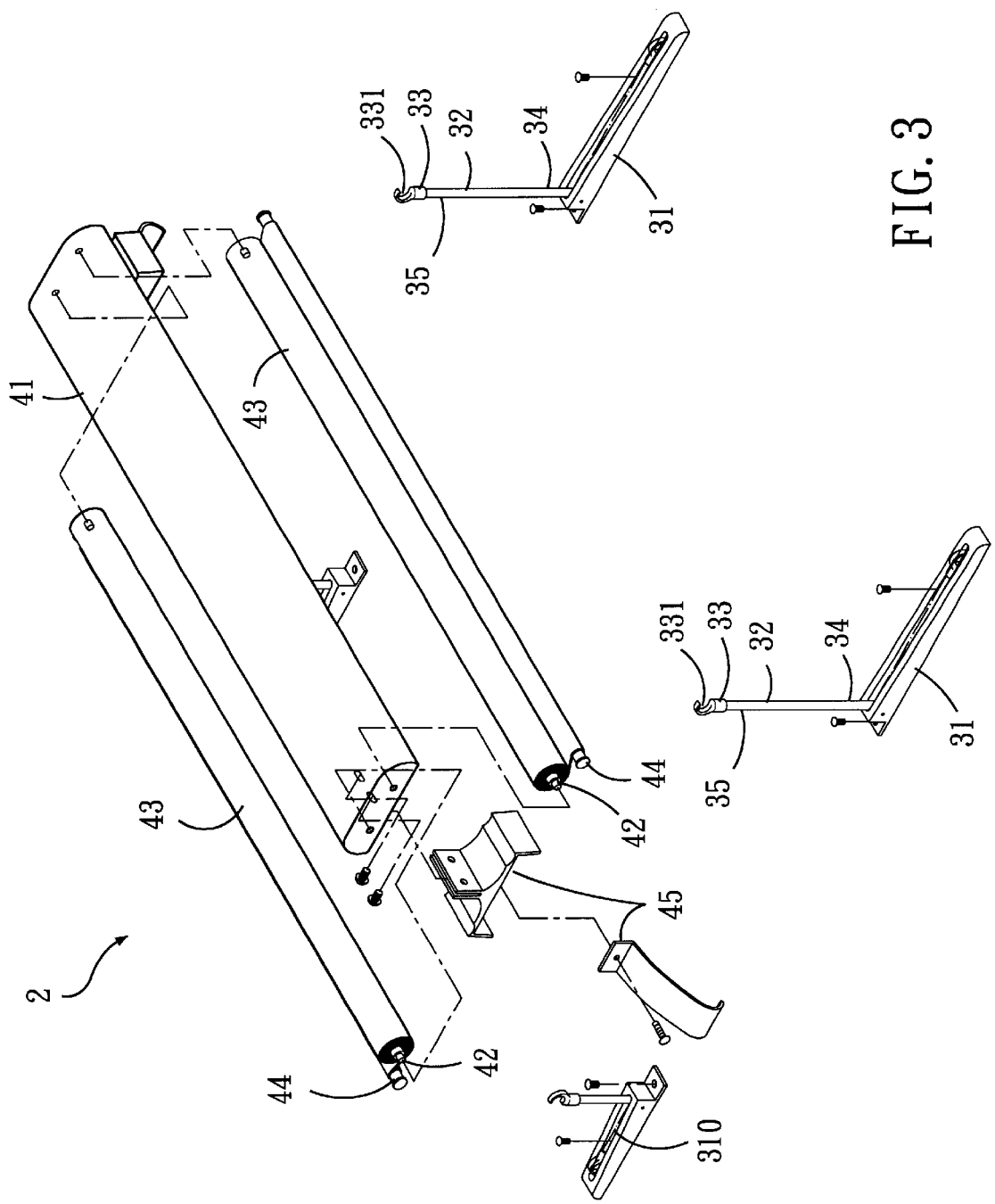
FIG. 3 is an exploded perspective view of the preferred embodiment of a shading device for an automobile according to this invention.
Figure 4:
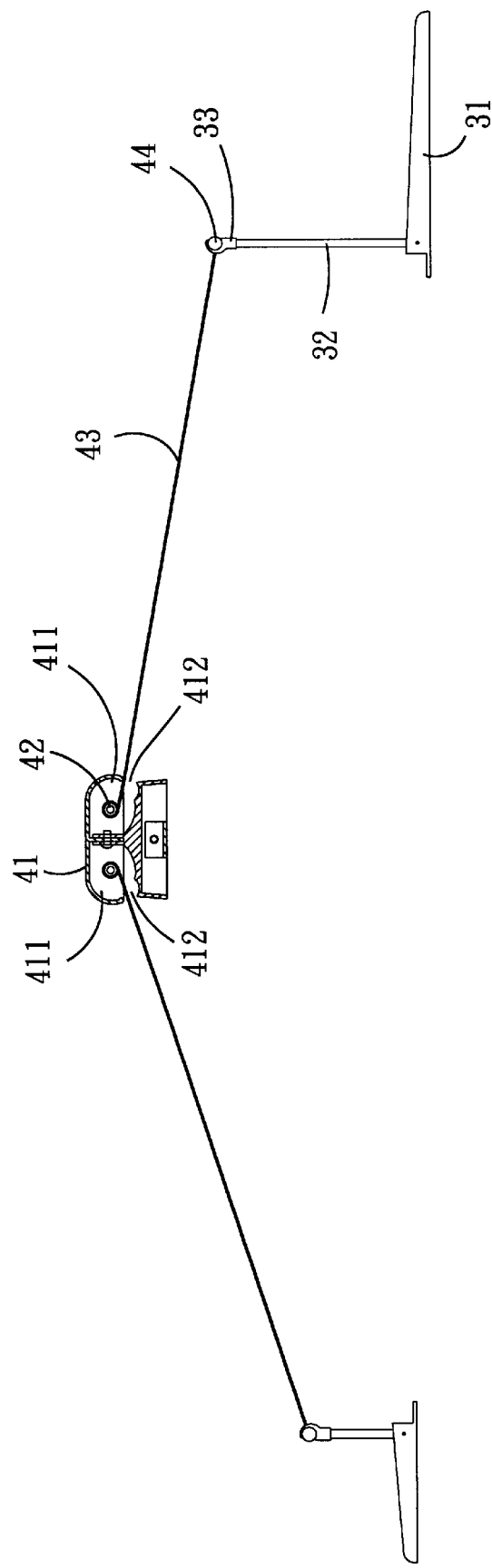
FIG. 4 is a schematic partly sectional view of the preferred embodiment in a shading state.
Figure 7:
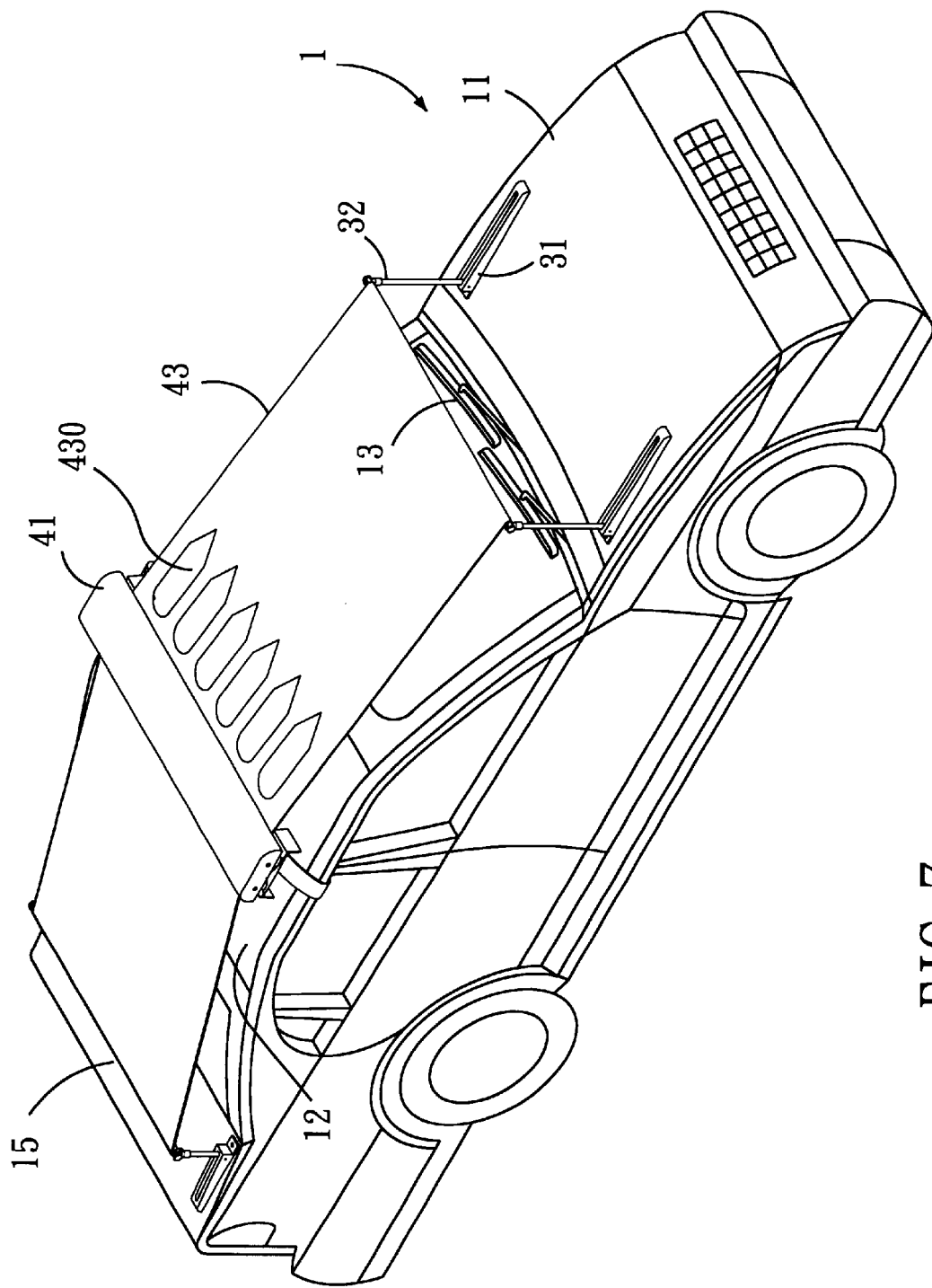
FIG. 7 is a perspective view of the preferred embodiment in a shading state.

Referring to FIGS. 3, 4 and 7, the preferred embodiment of a shading device 2 according to this invention is shown to be used for shading a moving automobile 1 from sunlight and rain. The shading device 2 includes a shell member 41, two winding shafts 42, two shading members 43, two pairs of spaced apart base members 31, two pairs of supporting legs 32, and two operating bars 44.

The shell member 41 is mounted on a roof 12 of the automobile 1 in a direction transverse to a front-to-rear direction of the automobile 1 using any suitable manner, such as by an anchoring assembly 45 shown in FIG. 3, and has two receiving spaces 411 adjacent to each other. The shell member 41 is further provided with two slots 412 in the transverse direction for passage of the shading members 43 therethrough.

Each of the winding shafts 42 is pivotally mounted in a corresponding one of the receiving spaces 411 of the shell member 41. Each of the shading members 43 is wound around a corresponding one of the winding shafts 42 and is received within a corresponding one of the receiving spaces 411 of the shell member 41. The shading members 43 can be made of any suitable material, such as plastic sheet or fiber fabric, and the like. Preferably, the front one of the shading members 43 is provided with a plurality of ventilation holes 430, as best shown in FIG. 7.

Two pairs of spaced apart base members 31 are mounted respectively on a front part (i.e., hood) 11 and a rear part (i.e., trunk) 15 of the automobile 1 using any suitable manner, such as by screwing, and are spaced from the shell member 41 in the front-to-rear direction. Each of the supporting legs 32 is mountable on a corresponding one of the base members 31. Each of the base members 31 has a receiving groove 310 elongated in the front-to-rear direction for receiving the corresponding one of the supporting legs 32. Each of the supporting legs 32 includes a first end portion 34 pivotally connecting to the corresponding one of the base members 31, and a second end portion 35 opposite to the first end portion 34. Each of the supporting legs 32 is foldable downward to lie within the receiving groove 310 in the corresponding one of the base members 31. The second end portion 35 of each of the supporting legs 32 includes a resilient hook 33 with an opening 331 smaller than the cross-section of the operating bar 44 so as to anchor the operating bar 44 within the hook 33.

Each of the operating bars 44 is connected to one end portion of a corresponding one of the shading members 43, and is operable to unwind the corresponding one of the shading members 43. Each of the operating bars 44 is mountable detachably on the hooks 33 of the corresponding pair of the supporting legs 32 to stretch out the corresponding one of the shading members 43.

Additionally, the winding shafts 42 have elastic restoring members (not shown) for winding the shading members 43 back around the winding shafts 42 automatically when the operating bars 44 are detached from the hooks 33 of the supporting legs 32.

Figure 5:
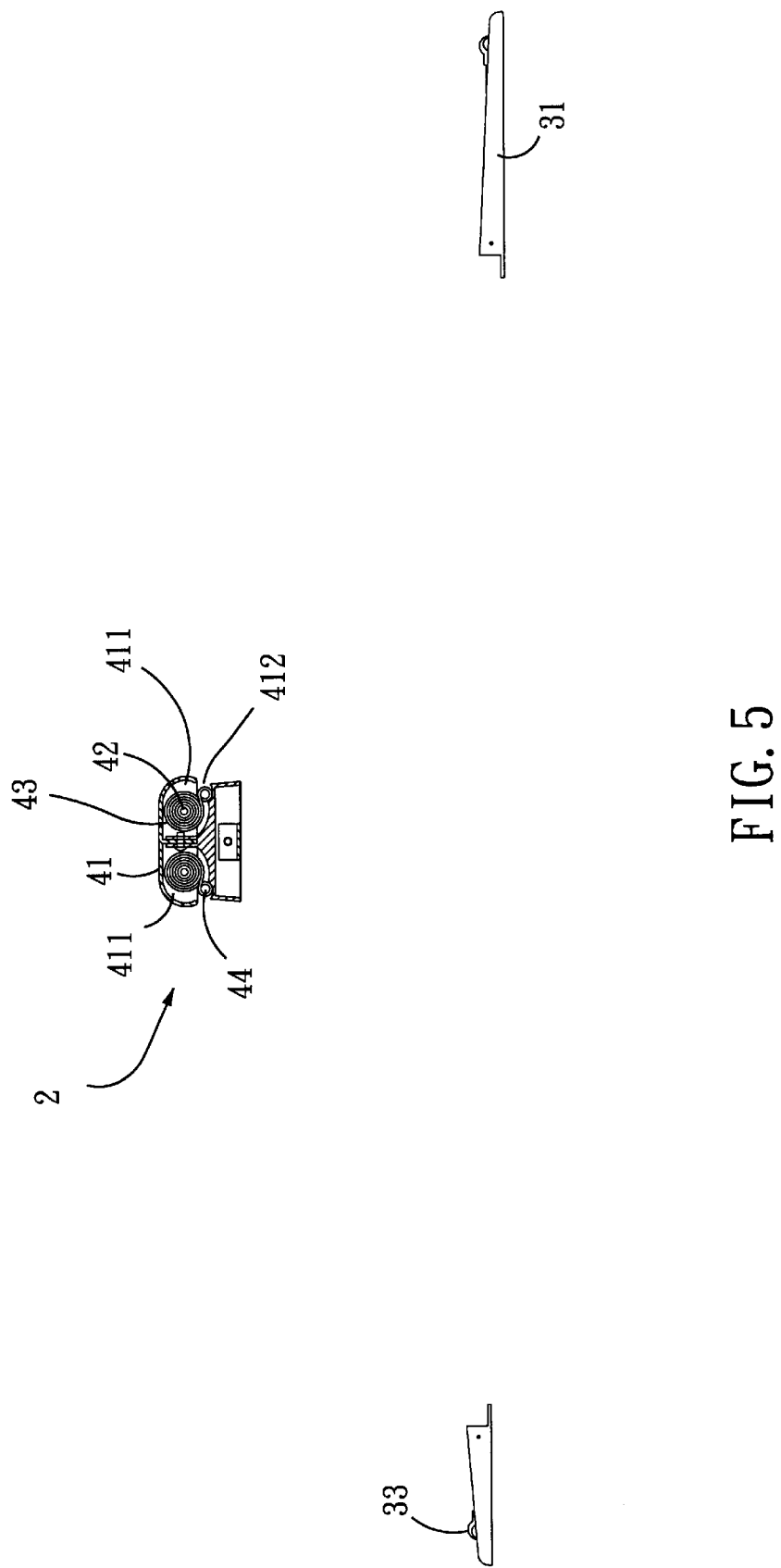
FIG. 5 is a schematic partly sectional view of the preferred embodiment in a winding state.
Figure 6:
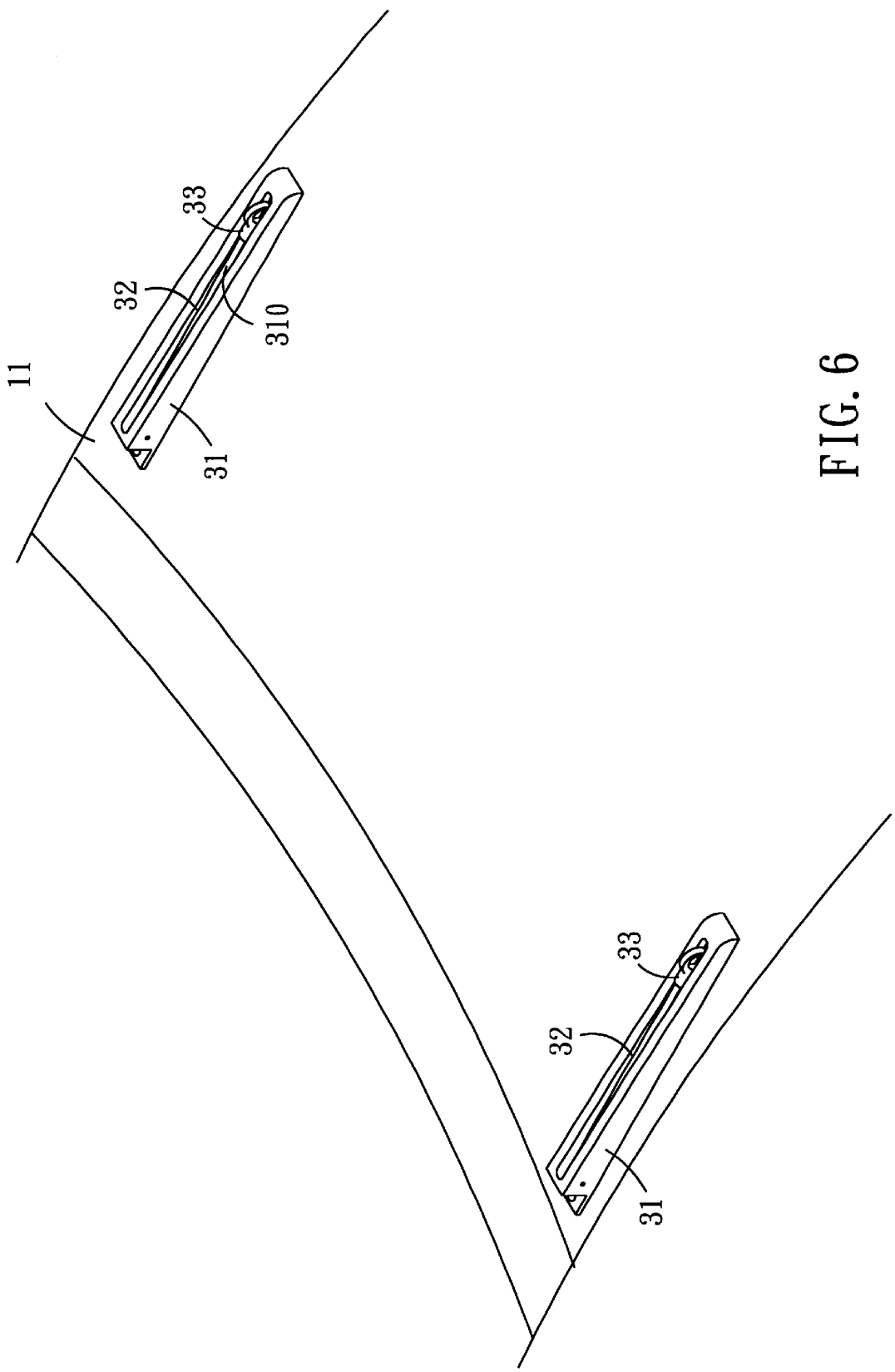
FIG. 6 is a fragmentary perspective view of the preferred embodiment to illustrate a pair of base members and supporting legs that are mounted on the automobile.

Referring to FIGS. 5 and 6, when the shading device 2 according to this invention is not in use, as described above, the operating bars 44 are detached from the hooks 33, and the shading members 43 are wound automatically back around the winding shafts 42 through the slots 412 in the shell member 41 so as to be received within the receiving spaces 411 of the shell member 41. Then, the supporting legs 32 can be folded to lie within the receiving grooves 310 of the base members 31.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A shading device adapted to be secured to an automobile, comprising:
   a shell member adapted to be mounted on a roof of the automobile in a direction transverse to a front-to-rear direction of the automobile, and having a receiving space;
   a winding shaft pivotally mounted in said receiving space of said shell member;
   a shading member wound around said winding shaft and received within said shell member;
   a pair of spaced apart base members adapted to be mounted on the automobile, and spaced from said shell member in said front-to-rear direction each of said base member has a receiving groove elongated in said front-to-rear direction;
   at least one pair of supporting legs mountable on said groove on said base members respectively to project upwardly from said base members; and
   an operating bar connected to one end portion of said shading member, and operable to unwind said shading member, said operating bar being mountable detachably on said supporting legs to span said supporting legs so as to stretch out said shading member, wherein each of said base members has a receiving groove elongated in said front-to-rear direction for receiving a respective one of said supporting legs.

2. The shading device of claim 1, wherein each of said supporting legs includes a first end portion pivotally connected to the corresponding one of said base members, said supporting legs being foldable downward to lie within said receiving groove of the respective one of said base members, and having a second end portion opposite to said first end portion.

3. The shading device of claim 2, wherein said second end portion of each of said supporting legs includes a hook for anchoring said operating bar therewithin.

4. A shading device adapted to be secured to an automobile, comprising:
   a shell member adapted to be mounted on a roof of the automobile in a direction transverse to a front-to-rear direction of the automobile, and having a receiving space;
   a winding shaft pivotally mounted in said receiving space of said shell member;
   a shading member wound around said winding shaft and received within said shell member;
   a pair of spaced apart base members adapted to be mounted on the automobile, and spaced from said shell member in said front-to-rear direction;
   at least one pair of supporting legs mountable on said base members respectively to project upwardly from said base members; and
   an operating bar connected to one end portion of said shading member, and operable to unwind said shading member, said operating bar being mountable detachably on said supporting legs to span said supporting legs so as to stretch out said shading member, wherein said shading member has a plurality of ventilation holes.

\* \* \* \* \*